J. M. LAUGHLIN.
Method of Making Horseshoe Nails.

No. 232,895.  Patented Oct. 5, 1880.

UNITED STATES PATENT OFFICE.

JOSEPH M. LAUGHLIN, OF BOSTON, ASSIGNOR TO BRIDGEWATER IRON COMPANY, OF BRIDGEWATER, MASSACHUSETTS.

METHOD OF MAKING HORSESHOE-NAILS.

SPECIFICATION forming part of Letters Patent No. 232,895, dated October 5, 1880.

Application filed January 15, 1879.

*To all whom it may concern:*

Be it known that I, JOSEPH M. LAUGHLIN, of the city of Boston, county of Suffolk, and State of Massachusetts, have made a new and useful Improvement in the Method of Punching Finished Horseshoe-Nails from Prepared Nail-Plates, of which the following is a specification.

Figure 1:
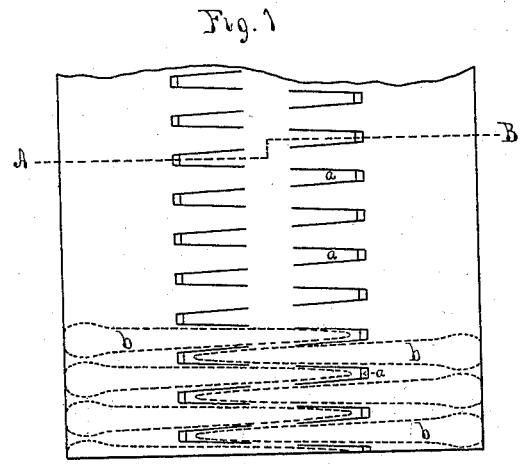
Figure 3:
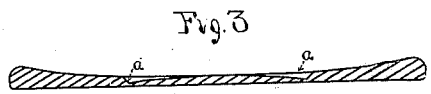

My invention relates to an improved method of producing horseshoe-nails from prepared nail-plates, such as is shown in Figure 1 of the drawings of my Letters Patent of November 7, 1876; and it consists in separating the depressions or indentures made in the prepared nail-plate sufficiently apart lengthwise of the plate to leave a complete margin or band of metal all around that part of the metal which is to be cut out as the finished nail, from head to point, and so that this band or margin of metal shall intervene between the spots in the plate on each side of the nail to be cut out while it is being cut from the plate, so that it shall lap by the next nail to save waste of stock, and in cutting out the nail from the plate, as above indicated, and substantially as hereinafter described, the object of the invention being to leave the entire edge of the nail perfect from head to point as it comes from the plate.

My invention further consists in placing the rows of alternate spots or depressions toward each side of the nail-plate so far apart in relation to the width of the nails which lap by each other and pass between the spots as to leave a narrow margin of metal between each nail and the spot or spots which it laps by, substantially as described.

In manufacturing horseshoe-nails from prepared nail-plates it is found necessary by me to have the nails cut out of the plate so that they shall lap by each other alternately from opposite directions, in order to save stock as much as possible. At the same time it is found necessary to cut each horseshoe-nail from the plate so as to leave a narrow thread or strip of metal all around it from head to point, of the same thickness and homogeneity, substantially, as the adjacent parts of the metal forming the nail which it borders. In these respects it is believed that the process of cutting horseshoe-nails with finished edges suitable for practical use continuously from a prepared nail-plate differs from any other process of cutting nails heretofore practiced, and, until my present invention, I believe it to have been supposed to be unprofitable to cut horseshoe-nails from a prepared plate in alternate rows lapping past each other, having their edges in a finished condition; and such horseshoe-nails have heretofore, I believe, always been finished on their points and edges by some subsequent process, either after being cut from the plate or after the waste stock of the plate has been cut away from them. These subsequent processes of finishing horseshoe-nails, owing to the difficulty of holding and operating upon them in large numbers in proper position for the operation of machinery for that purpose, have been found to constitute a large portion of the expense of manufacturing such nails properly by machinery, and have rendered such machine-manufactured horseshoe-nails inferior to those produced by hand-labor.

When the horseshoe-nails have been cut from the plate by machinery without having them alternately lap by each other, a large amount of the metal in the plate has been wasted, and the expense of the nails produced is so great as to counteract, in a great degree, the advantages of so producing them by machine. By my invention a great proportion of this waste metal is utilized without impairing the value of the finished nails as cut from the plate.

Figure 2:
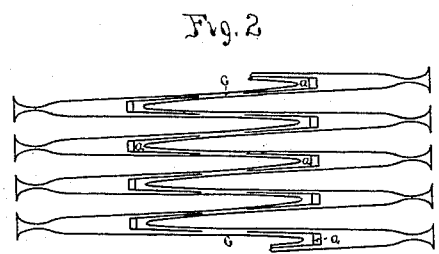

In the drawings, Figure 1 represents a horseshoe-nail plate of homogeneous iron prepared by spotting, as shown in Fig. 1 of my patent above referred to, but having the spots, which are placed in two rows, alternately, as shown, far enough apart to enable my invention to be practiced. Fig. 2 represents the waste of such a nail-plate after the nails have been cut therefrom according to my improved process.

*a a* are the spots or depressions in the nail-plate, made by stamping or pressing, to harden those parts of the plate and render them suitable for forming the points of the nails therefrom. Instead of these spots being placed as near together, as shown in my above-mentioned patent, and so that the side walls of the depressions shall form the edges of the nails which lap by them, in part, when cut from the plate, these spots are placed far enough apart with relation to the width of the nails lapping by them to leave a narrow thread or margin of the soft metal composing the plate between each nail lapping by a spot, and the latter, as it is cut from the prepared plate, as is shown in the dotted lines, inclosing the portions *b b* of the plate which are to form the completed nail.

*c c* are the portions of the plate which are left in the form of waste metal after the nails have been cut from the plate.

It will be observed that the depressions for the purpose of forming the points of the nails are not only located in two rows, one on each side of the longitudinal center of the plate, but that each depression in one row is opposite the space between two depressions in the other row, and thus the nails cut from the plate are enabled to be lapped past each other, to utilize as much of the metal of the plate as is possible, and prevent an undue amount of waste in the stock of the plate.

What I claim as new and of my invention, is—

1. The described process of cutting horseshoe-nails from a prepared plate, while having their point ends lapping past each other alternately, and leaving a thread of the metal of the plate of substantially the same thickness and homogeneity with the adjacent parts of the nail around the edge of the latter as it is cut from the plate, substantially as described.

2. The prepared nail-plate, having its depressions *a a* a sufficient distance apart with relation to the width of the nail lapping past them as it is cut from the plate to leave a margin of metal between each depression and such nail when cut away, substantially as described.

3. The described process of cutting horseshoe-nails from a plate (prepared with the different degrees of hardness in its several parts to correspond with the required hardness of the several parts of the nails cut therefrom) in such manner that as each nail is punched from the prepared plate there is left in the plate a thread or margin of its metal all around the nail of substantially the same thickness and homogeneity as the adjacent parts of the nail cut therefrom, substantially as described.

JOSEPH M. LAUGHLIN.

Witnesses:
DAVID HALL RICE,
L. C. RICE.